US008340097B2

(12) United States Patent
Kim et al.

(10) Patent No.: US 8,340,097 B2
(45) Date of Patent: Dec. 25, 2012

(54) GENERIC PACKET BLOCK APPLICABLE TO MULTIPLE ROUTING SCHEMES IN LOW-POWER SENSOR NETWORKS AND METHOD OF PROVIDING THE SAME

(75) Inventors: Eunsook Kim, Daejeon (KR); Kaspar Dominik, Daejeon (KR); Sang Keun Yoo, Daejeon (KR); Jun Seob Lee, Daejeon (KR); Yong-Woon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 121 days.

(21) Appl. No.: 12/747,780

(22) PCT Filed: Sep. 3, 2008

(86) PCT No.: PCT/KR2008/005168
§ 371 (c)(1),
(2), (4) Date: Sep. 7, 2010

(87) PCT Pub. No.: WO2009/075457
PCT Pub. Date: Jun. 18, 2009

(65) Prior Publication Data
US 2010/0329260 A1 Dec. 30, 2010

(30) Foreign Application Priority Data
Dec. 11, 2007 (KR) .................. 10-2007-0128040

(51) Int. Cl.
*H04L 12/28* (2006.01)
*H04L 12/56* (2006.01)
(52) U.S. Cl. ..................... 370/392; 370/389
(58) Field of Classification Search ........... 370/389–392
See application file for complete search history.

(56) References Cited

U.S. PATENT DOCUMENTS

| 7,173,905 B1 * | 2/2007 | Alex et al. ................ 370/230 |
| 7,958,242 B2 * | 6/2011 | Rey ............................. 709/227 |
| 2003/0223395 A1 | 12/2003 | Chitrapu |

(Continued)

FOREIGN PATENT DOCUMENTS
KR  10-2006-0068536  6/2006
(Continued)

OTHER PUBLICATIONS

Ian F. Akyildiz et al., "A survey on sensor networks," IEEE Communications Magazine, Aug. 2002, pp. 102-114.

(Continued)

*Primary Examiner* — Chuong T Ho
(74) *Attorney, Agent, or Firm* — Staas & Halsey LLP

(57) ABSTRACT

The present invention relates to a generic packet block applicable to multiple routing schemes in low-power sensor networks and a method of providing the same which reduces operations and information required for a routing scheme in the low-power sensor network and provides flexible extension applicable to various multi-hop routing schemes. The generic packet block includes a generic routing header and routing block, and the method of providing the same is widely applicable to a multi-hop routing. The generic routing header includes a routing packet type, routing address information, and the like, commonly required for the multi-hop routing. The routing block is located in a routing packet body and includes routing cost information changeable depending on a routing scheme, and information changeable depending on a routing operation scheme.

8 Claims, 8 Drawing Sheets

U.S. PATENT DOCUMENTS

| | | | |
|---|---|---|---|
| 2005/0078672 A1* | 4/2005 | Caliskan et al. | 370/389 |
| 2007/0110069 A1 | 5/2007 | Lim et al. | |
| 2007/0195776 A1* | 8/2007 | Zheng et al. | 370/392 |
| 2007/0237147 A1* | 10/2007 | Quinn et al. | 370/392 |
| 2008/0070614 A1* | 3/2008 | Ogushi et al. | 455/522 |
| 2008/0165770 A1* | 7/2008 | Shin et al. | 370/389 |
| 2009/0059842 A1* | 3/2009 | Maltseff et al. | 370/328 |

FOREIGN PATENT DOCUMENTS

| | | |
|---|---|---|
| KR | 10-2007-0050727 | 5/2007 |

OTHER PUBLICATIONS

International Search Report for PCT/KR2008/005168, mailed on Mar. 6, 2009.

Decision to Grant a Patent for Priority Document KR 10-2007-0128040, dated Jan. 21, 2010.

* cited by examiner

GENERIC PACKET BLOCK APPLICABLE TO MULTIPLE ROUTING SCHEMES IN LOW-POWER SENSOR NETWORKS AND METHOD OF PROVIDING THE SAME

CROSS REFERENCE TO RELATED APPLICATIONS

This application claims the benefit under 35 U.S.C. Section 371, of PCT International Application No. PCT/KR2008/005168, filed Sep. 3, 2008, which claimed priority to Korean Application No. 10-2007-0128040, filed Dec. 11, 2007, the entire disclosures of which are incorporated by reference as a part of this application.

TECHNICAL FIELD

The present invention relates to a generic packet block and method of providing the same, and more particularly, to a generic packet block applicable to a multiple routing schemes in low-power sensor networks for a multi-hop routing and a method of providing the same. This work was supported by the IT R&D program of MIC/IITA. [2007-P10-07, USN networking and application technology standards development]

BACKGROUND ART

In general, sensor devices have a short transmission range, low data transmission rate, low power consumption, low memory, and low price. In a low-power sensor network including sensor devices, a multi-hop routing supporting a mesh topology is required.

Low-power multi-hop routing schemes are applied to sensor networks in a wide variety of environments. Much research on a node centric, data centric, and location centric low-power multi-hop routing scheme has been conducted. In a node centric multi-hop routing scheme, each sensor node has its own identification (ID), and performs routing using an ID. In a location centric multi-hop routing scheme, a sensor node recognizes an address and performs routing using location information of each sensor node. In a data centric multi-hop routing scheme, a user does not have information about a location of a sensor node providing required information, and when information of a particular condition is requested, a sensor node including the information responds. That is, since these researches have been conducted in a way that routing information is defined based on very service-specific way, the multiple routing schemes may not be efficiently installed in a sensor node for common purpose, when a sensor node with low-power and low memory is installed for a variety of purposes which requires different routing schemes.

It has been suggested to reuse the multi-hop routing schemes designed for Ad-hoc networks such as an Ad-hoc On-demand Distance Vector (AODV), Dynamic Manet On-demand (DYMO), Optimized Link State Routing (OLSR), and the like for multi-hop routing function in a sensor network. However, these multi-hop routing schemes are designed not for low-power, low-memory sensor networks, and thus these scheme may not be suitable for a sensor node.

In some research, a method enabling an ad-hoc routing scheme such as an AODV, designed in an IP network, to be suitable for a sensor node has been conducted by simplifying the routing information and process. However, each sensor node is required to install different routing scheme if the service requires different routing schemes. Easy way to make the sensor node use for common-purpose is to install more than one routing scheme. However, it causes processing complexity and memory waste which is critical in sensor node, as the routing protocols use all different message scheme and processing procedures.

DISCLOSURE

Technical Problem

The present invention provides a generic packet block which is applicable to a multiple routing scheme in a low-power sensor network. It reduces memory requests and packet process calculations for multi-hop routing functions, satisfying a feature of a low-power and low-price sensor node. The present invention also provides a method of providing one or more multi-hop routing protocols to be used as multi-purpose or common-purpose, without the problems mentioned in the 'Background of Art'.

Specifically, the designed generic packet block contains the routing packet information which is collected from the most commonly used and the most necessary information for multi-hop routing in low-power sensor networks, Thus, information and processes required for the routing scheme can be reduced and message extension may be widely applied to various multi-hop routing schemes.

The present invention allows that a routing scheme using the defined generic packet block can forward the routing messages after decoding only generic routing header information without interpreting the following routing message body, and thereby improving the efficiency of routing for low-power sensor nodes and reducing the complexity of routing message processing.

The present invention is designed to enable that the generic routing header and the message body type are easily applied to routing algorithms different from each other. With this invention, multiple routing schemes will use a common packet types even when the routing algorithms are different, a routing function module of a sensor node needs to change only a packet field value of a routing block, not an entire routing packet, and may be applied to various routing algorithms.

The present invention also provides that a new message type is easily extended and the existing routing schemes to be easily supported, as the defined packet configuration is designed to put the routing information which can be differ by each routing scheme in a routing block, and thereby each routing packets can utilize the routing block to fit its purpose.

Technical Solution

According to an aspect of the present invention, there is provided a generic packet block applicable to a multiple routing scheme in a low-power sensor network, the generic packet block including: routing packet semantics including information about start of a routing packet and a type of routing; a generic routing header including routing message type; and a routing block including information about the type of the routing and message type of the routing.

In this instance, the generic routing header includes at least one of an address used for the routing, a maximum number of hops for the routing is performed, a current number of hops on the routing, and a target node address of the routing.

In this instance, the information about the routing type and routing message type is changeable depending on the routing scheme in use.

In this instance, the generic packet block includes information about the generic routing header, routing scheme, and information changeable depending on an operation scheme, the information about the generic routing header and routing scheme being necessary for the routing.

In this instance, the generic packet block includes a routing body defining a routing block of the routing, and provides an extension of a message with respect to the multiple routing scheme in a sensor network where the multiple routing scheme is applied.

According to an aspect of the present invention, there is provided a method of providing a generic packet block applicable to a multiple routing scheme in a low-power sensor network, the method including: separating a generic routing header and routing block and configuring a generic packet block, the generic routing header including a type of routing message, the routing block including information about the routing type and routing message type; and transmitting a routing packet using packet information of the generic routing header of the generic packet block.

In this instance, the configuring configures the generic packet block comprising routing packet semantics including information about a start of the routing packet and the type of the routing.

According to an aspect of the present invention, there is provided a method of controlling a sensor node in a low power sensor network, the method including: interpreting routing packet semantics including a start of a routing packet and a type of a routing; interpreting a generic routing header including at least one of a routing message, an address used for the routing, a maximum number of hops where the routing is transmitted, a number of hops where the routing is performed, and a target node address of the routing; determining a destination of the routing packet based on information from the interpreted generic routing header; determining, when the destination of the routing packet corresponds to a sensor node as a result of the determining of the destination, whether the routing packet is a routing request message; and transmitting a routing response message, when the routing packet is the routing request message as a result of the determining of whether the routing packet is the routing request message.

In this instance, the method of controlling a sensor node in a low power sensor network further includes forwarding the routing packet to another sensor node using information included in the generic routing header, when the destination of the routing packet does not correspond to the sensor node.

MODE FOR INVENTION

Hereinafter, embodiments of the present invention are described in detail by referring to the figures.

Figure 1:
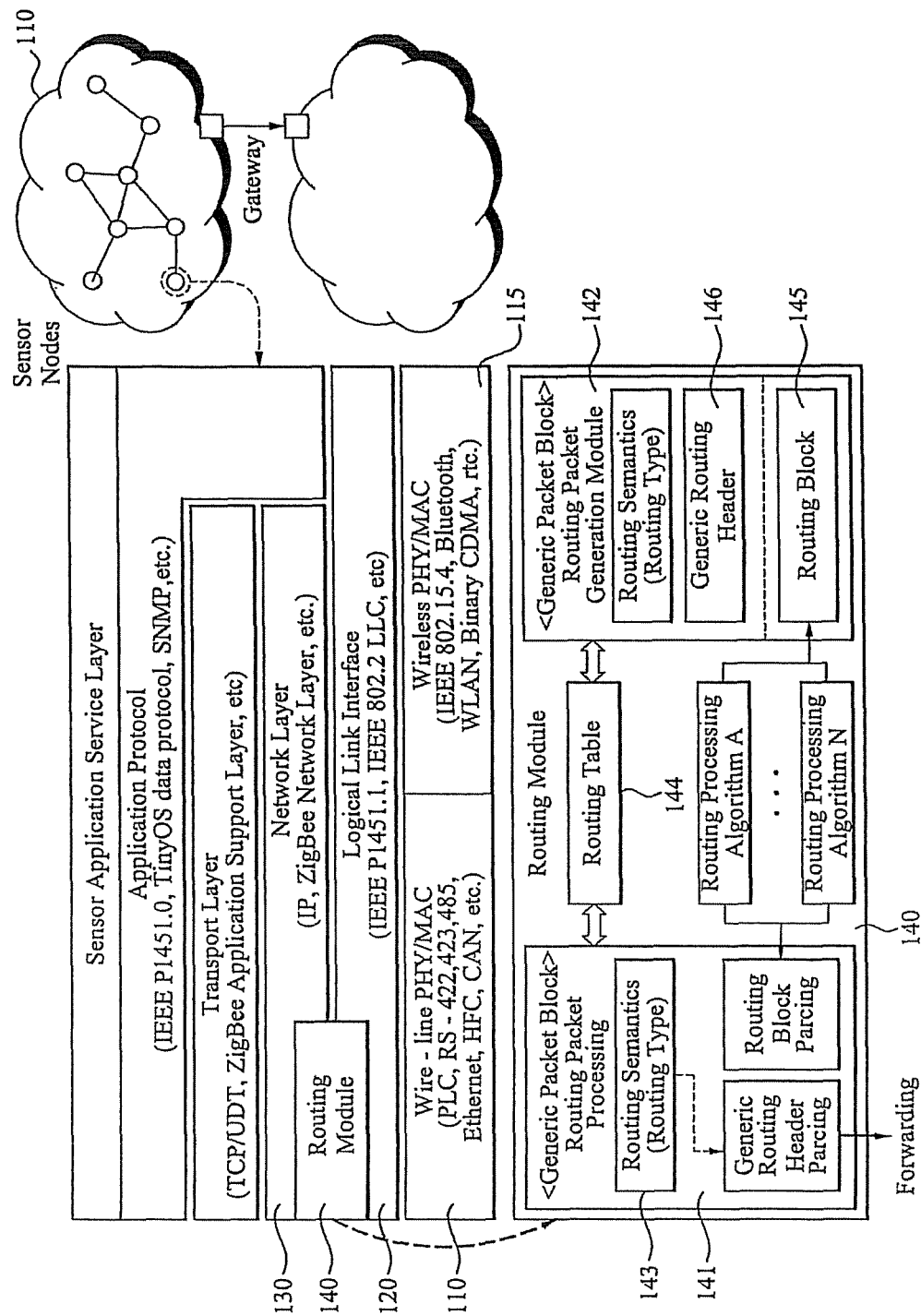
FIG. 1 is a diagram illustrating a configuration of a low-power sensor network, protocol layer of a sensor node, and configuration of a routing function block according to an embodiment of the present invention.

FIG. 1 is a diagram illustrating a configuration of a low-power sensor network 110, protocol layer of a sensor node, and configuration of a routing function block according to an embodiment of the present invention. Referring to FIG. 1, the configuration of the low-power sensor network, protocol layer of the sensor node, and configuration of the routing function block are described.

FIG. 1 illustrates a configuration of functional architecture of a sensor node in a low-power sensor networks showing functional blocks of the routing module in detail, which uses the generic packet block for multi-hop routing.

As illustrated in FIG. 1, a multi-hop routing module 140 is located in the range from the logical link interface 120 to the network layer 130, as it needs to use information of a PHY/MAC layer 110 and 115 in the low-power sensor network 110 and the network layer 130 functions, In this instance, when a generic routing packet block scheme is used, a routing packet processing module 141 and routing packet generation module 142 to provide a routing function may be applied to any routing algorithm.

Routing semantics 143 of the routing packet processing module 141 reports that a transmitted packet is a routing packet. Also, when at least more than one routing algorithm is used in a single sensor node, information about a routing type is included in the routing semantics 143.

Information about a generic routing header 146 contains common information for routing so that it is applicable in generic purpose no matter which routing schemes are chosen. The generic routing header 146 searches routing table 144 to retrieve a routing path to a target node address (Target-Node.Address).

A routing block 145 included in a routing message body may be flexibly defined in a routing scheme. The information about the generic routing header 146 is affected by a target node and routing scheme in the routing packet generation module 142.

Figure 2:
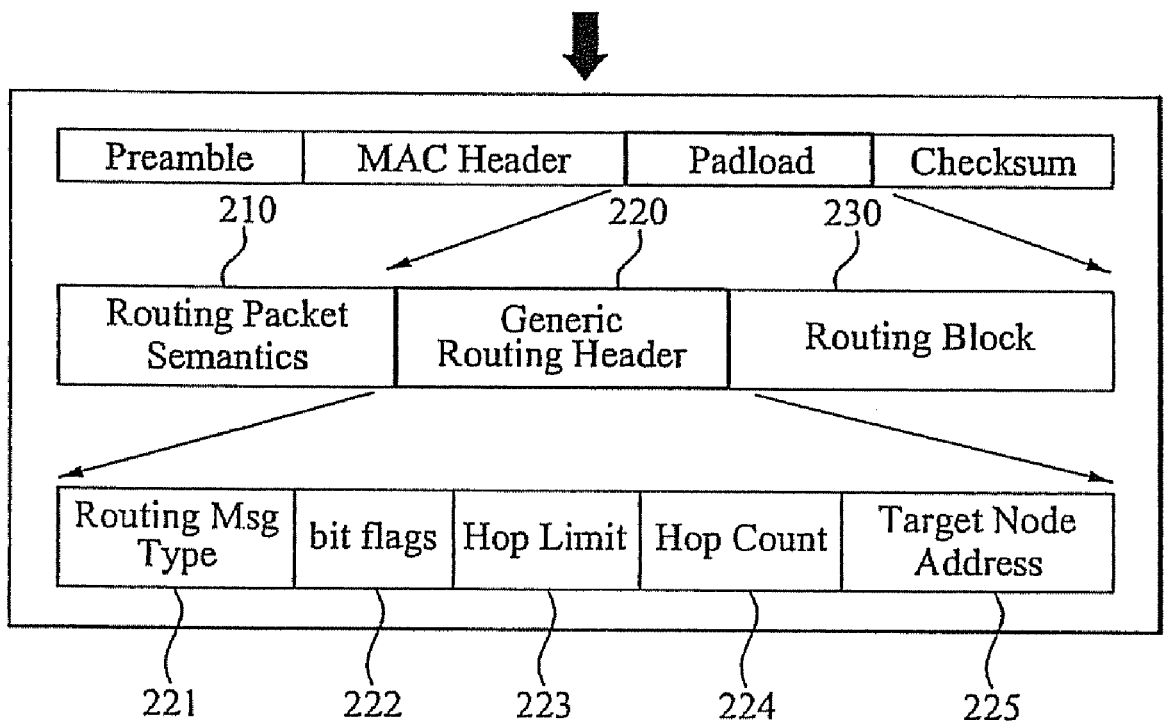
FIG. 2 is a diagram illustrating a packet configuration and information value of a generic packet block according to an embodiment of the present invention.

FIG. 2 is a diagram illustrating a packet configuration and information value of a generic packet block according to an embodiment of the present invention. Referring to FIG. 2, the packet configuration and information value of a generic packet block is described.

As illustrated in FIG. 2, multi-hop routing information is required to be transmitted as a single frame in a low-power sensor network without an extreme fragmentation and reassembly. According to an embodiment of the present invention, the multi-hop routing information may be designed to be included in the single frame provided in a PHY/MAC layer used in a sensor network.

For example, when a PHY/MAC used in the sensor network is Institute of Electrical and Electronics Engineers (IEEE) 802.15.4, all information is required to be included in 128 bit information. A single routing packet includes routing packet semantics 210 and routing message (220, 230). The routing packet semantics 210 has information about a start of the routing packet and a routing type. The single routing message includes a generic routing header 220 and routing block 230. The generic routing header 220 is used for common information for routing regardless of routing schemes, and the routing block 230 corresponds to a routing message body is used for routing-scheme specific information.

The single generic routing header 220 includes a routing message type 221, bit flags 222 indicating types of addresses used for the routing, hop limit 223 indicating a maximum number of hops which is the threshold value of the maximum number of hops which the routing packets can be transmitted, hop count 224 indicating a number of hops which shows the current number of hops that the routing packet has been passed, and target node address 225 indicating a target address corresponding to a target of the routing.

Figure 3:
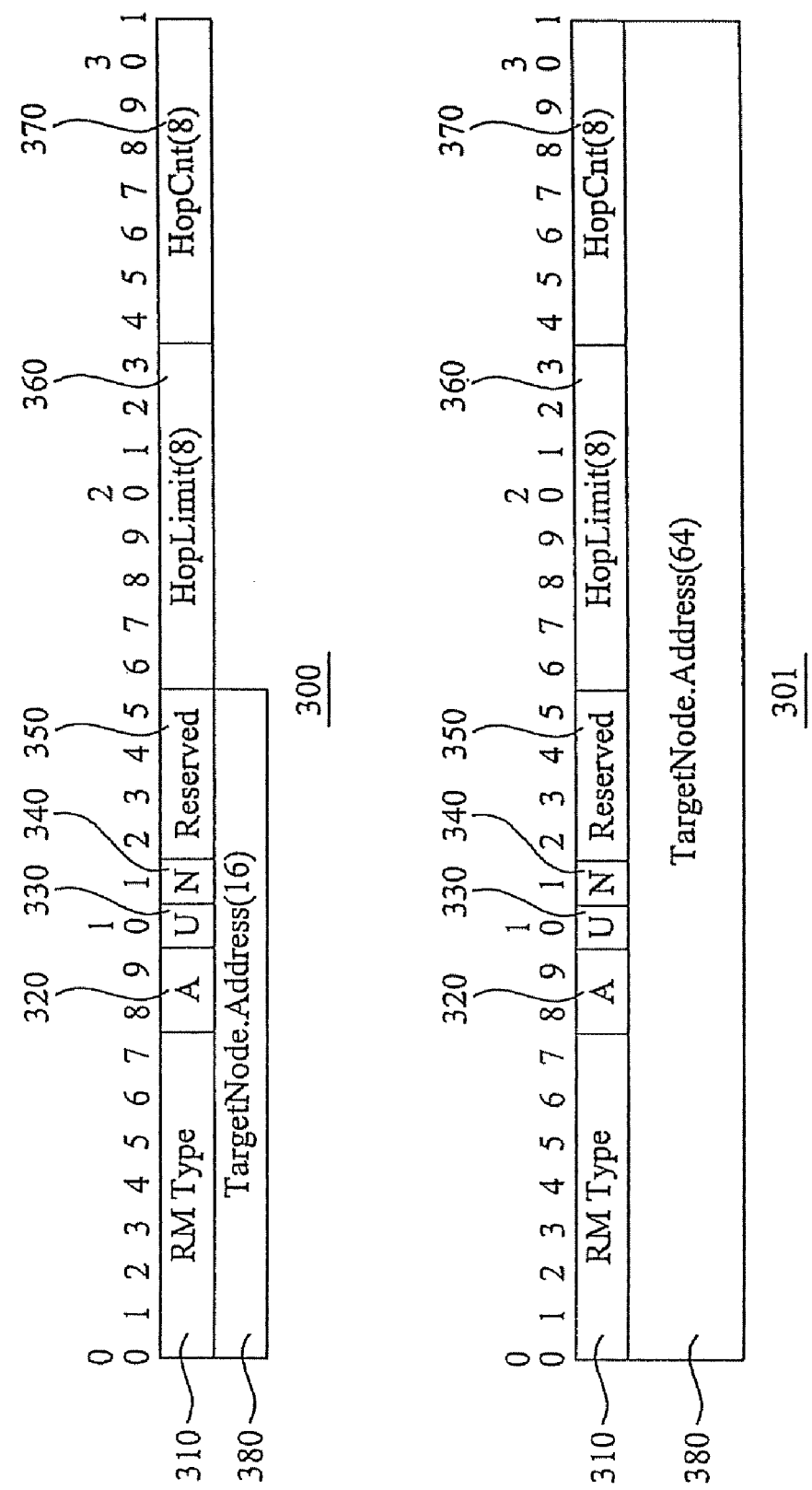
FIG. 3 is a diagram illustrating a configuration and information value of a generic routing header according to an embodiment of the present invention.

FIG. 3 is a diagram illustrating a configuration and information value of a generic routing header 300 and 301 according to an embodiment of the present invention. It is illustrated a generic routing header 300 and 301 when a 16-bit address value and 64-bit address value are used, as an example that the routing scheme uses IEEE 802.15.4 addresses which are widely used in a sensor node. Referring to FIG. 3, the configuration and information value of the generic routing header 300 and 301 is described.

The generic routing header 300 and 301 is designed to have a fixed length. Accordingly, header length information may not be used and overhead of header processing may be reduced. The generic routing header 300 and 301 includes an RM type 310, field value A 320, field value U 330, field value N 340, reserved bits 350, and address information 380 of a target node. The RM type 310 indicates a routing message type, the field value A 320 indicates an address type used for routing, the field value U 330 indicates a transmission scheme such as unicast, and the like, and the field value N 340 indicates whether a corresponding header is followed by a subsequent header and block. The reserved bits 350 may be used when a field value is additionally required, and the address information 380 is based on an address type defined in the field value A 320.

Also, a hop limit 360 and hop count 370 are defined as 8 bits, respectively, in the generic routing header 300 and 301. The hop limit 360 indicates a maximum number of hops it can traversed and the hop count 370 indicates a number of current hops. The number of bits may be controlled according to a routing scheme.

In this instance, when the field value U 330 is checked as '1', the field value U 330 indicates that a response using unicast is desired. Also, when the field value N 340 is checked as '1', the field value N 340 indicates that an additional block exists behind a header.

Figure 4:
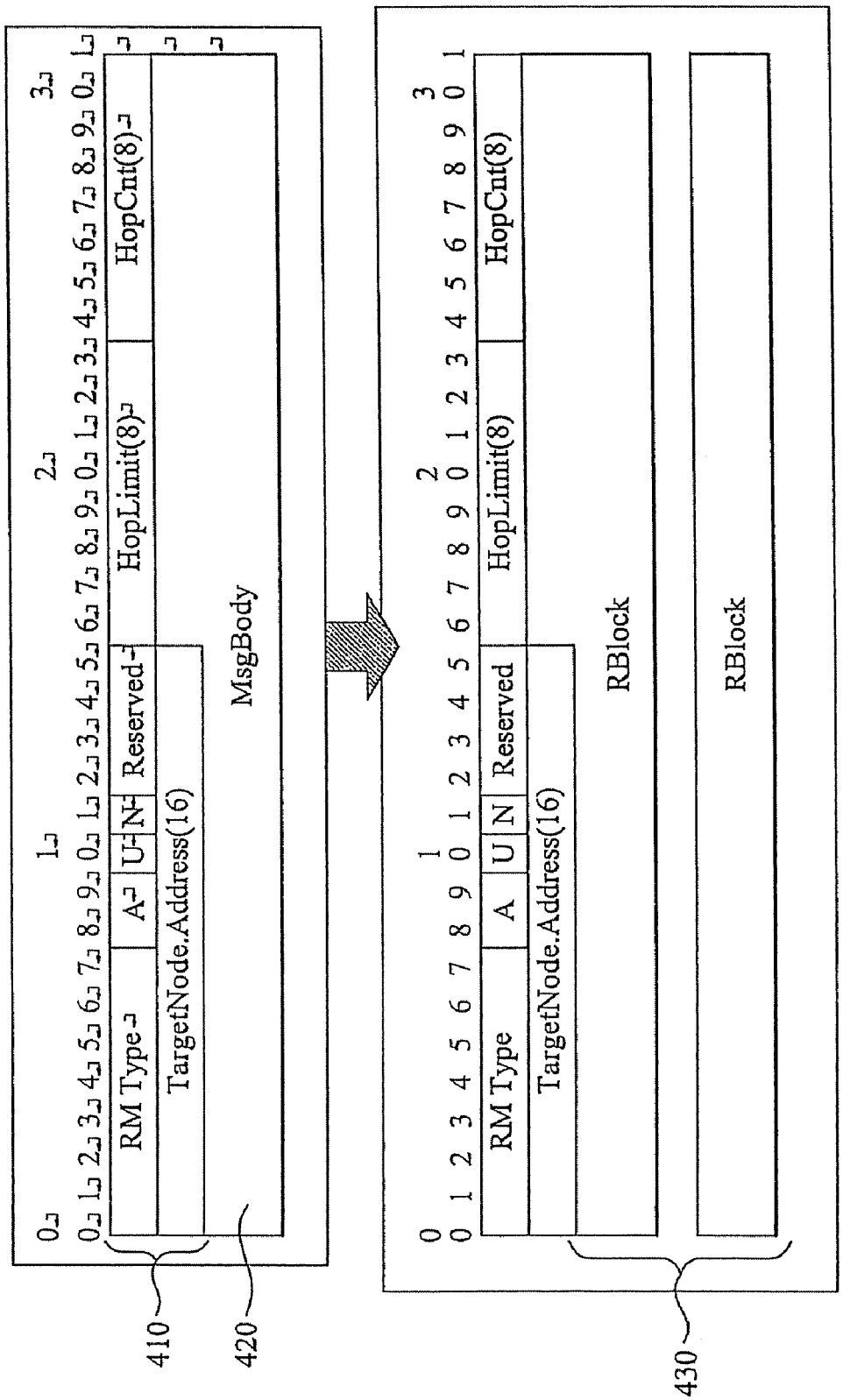
FIG. 4 is a diagram illustrating a configuration of a generic routing message according to an embodiment of the present invention.

FIG. 4 is a diagram illustrating a configuration of a generic routing message according to an embodiment of the present invention. Referring to FIG. 4, the configuration of the generic routing message is described.

A message body 420 following a generic routing header 410 includes at least one routing block 430 flexibly applying information required for each routing type.

Figure 5:
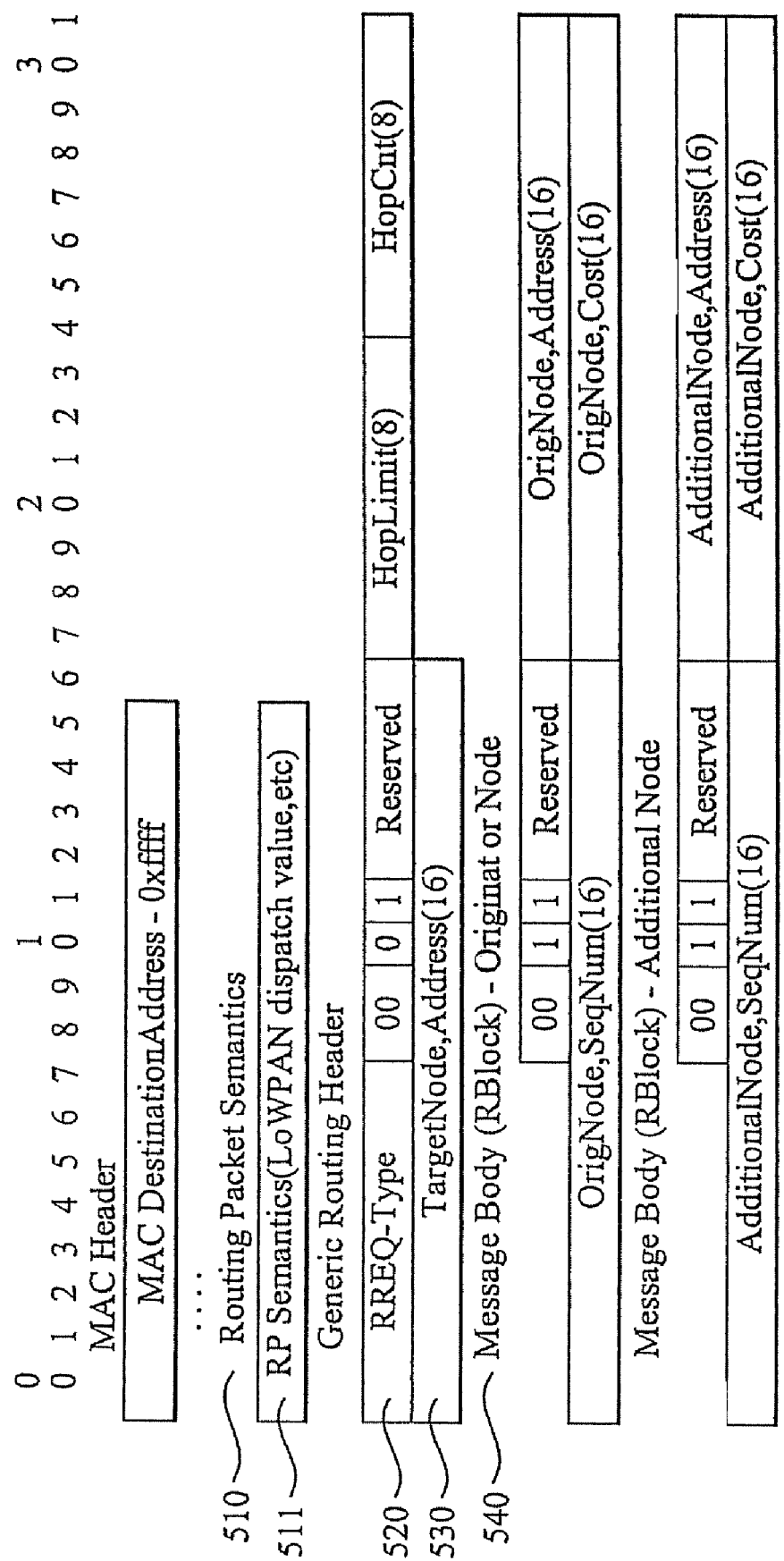
FIG. 5 is a diagram illustrating a routing message generating a routing packet according to an embodiment of the instance of the present invention.
Figure 6:
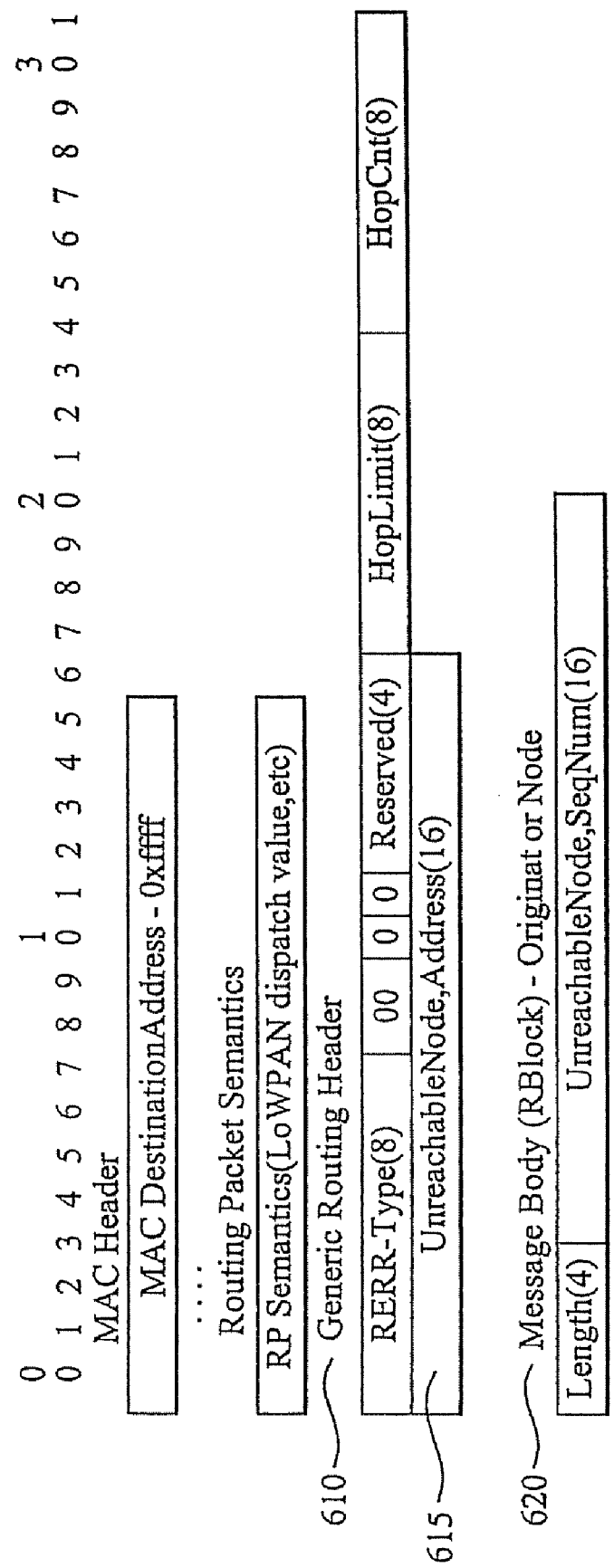
FIG. 6 is a diagram illustrating a routing message generating a routing packet according to another embodiment of the instance of the present invention.

FIGS. 5 and 6 are diagrams illustrating an instance of a routing message which generates a routing packet by applying a generic packet block scheme according to an embodiment of the present invention. An embodiment of the routing request message is illustrated in FIG. 5. An embodiment of a routing error message is illustrated in FIG. 6. Referring to FIGS. 5 and 6, the routing message which generates the routing packet by applying the generic packet block scheme is described.

As illustrated in FIG. 5, routing packet semantics 510 indicates that a MAC header is followed by a routing message. The routing packet semantics 510 fills an allocated dispatch value for routing in an Internet Protocol Version 6 Low Power Wireless Personal Area Network (PAN), or an allocated value for routing in other sensor network technologies.

An RREQ 520 of a routing message type indicates a routing request message. A target node address 530 becomes a target address for routing. A routing block (Rblock) 540 of a message body indicates an address of a node and a node cost defined in a corresponding routing scheme. The node cost may be a number of hops. Also, a variety of metrics such as location information, delay, and the like may be used in a location-based routing scheme.

As illustrated in FIG. 6, in the routing error message, the target address of the generic routing header 610 indicates the node address 615 which fails to connect a routing path. The type of errors is marked on a routing block of a message body 620.

According to the embodiment of the present invention, packet information for a multi-hop routing in a low-power sensor network is designed as a generic packet block, and the generic packet block is applied to routing. Accordingly, information and processes required for routing in the low-power sensor network may be reduced, and a message extension applicable to various multi-hop routing schemes may be provided. Also, routing message parsing, processing, change, and extension may be easily performed in a multiple routing scheme.

Figure 7:
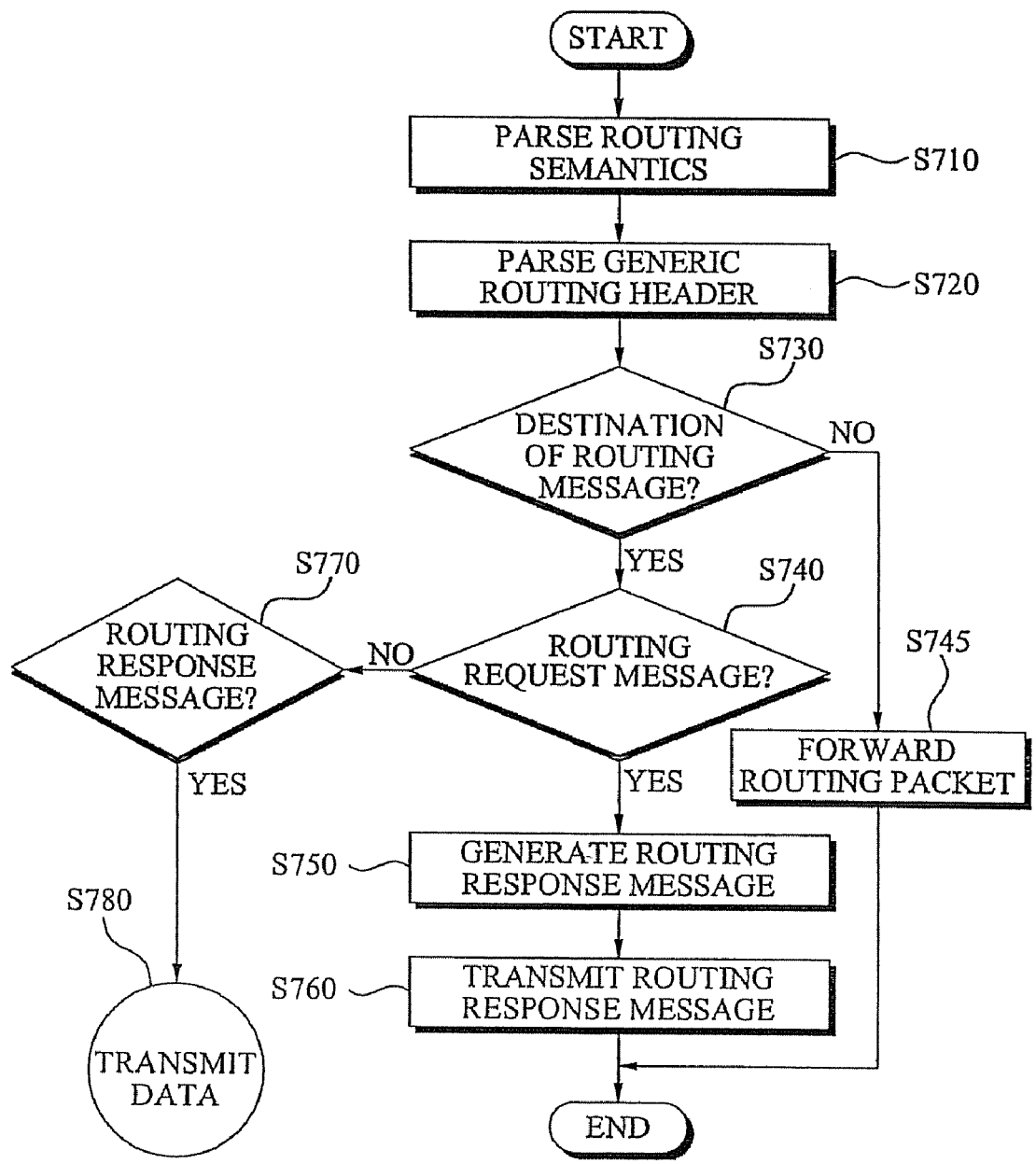
FIG. 7 is a flowchart illustrating procedures of the reception of a routing message using a generic packet block according to an embodiment of the present invention.
Figure 8:
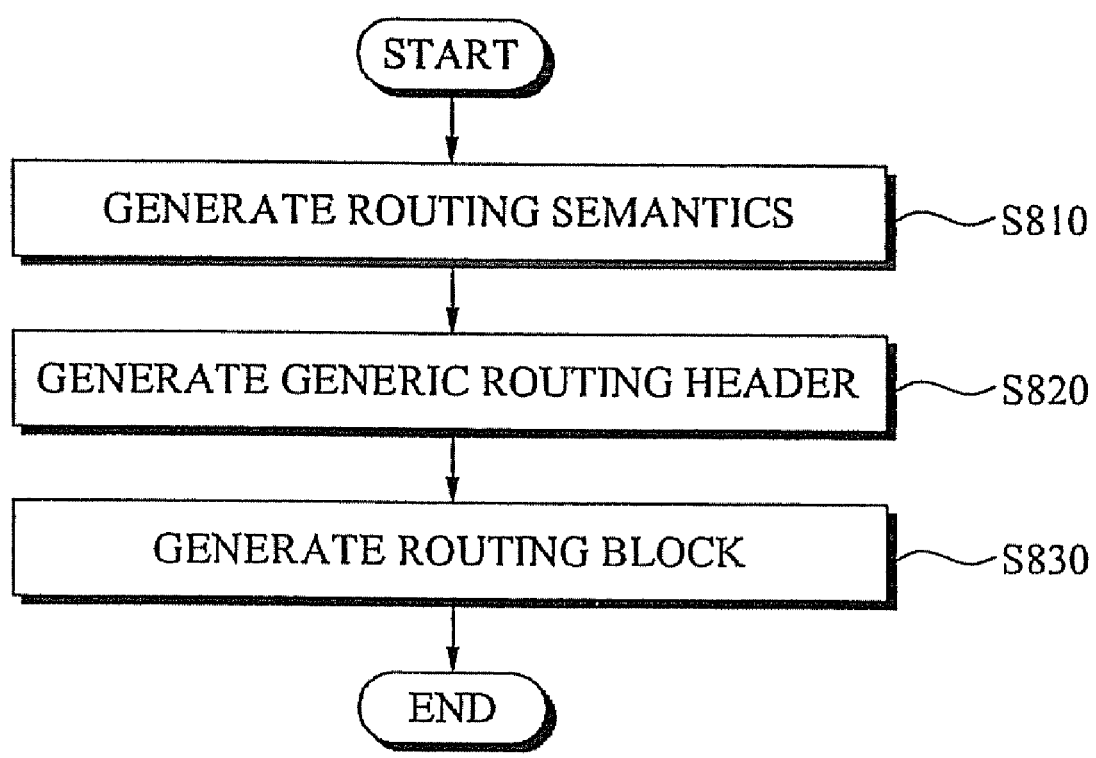
FIG. 8 is a flowchart illustrating a method of generating a generic packet block applicable to a multiple routing scheme in a low-power sensor network according to an embodiment of the present invention.

FIG. 7 is a flowchart illustrating procedures of the reception of a routing message using a generic packet block according to an embodiment of the present invention. FIG. 8 is a flowchart illustrating a method of generating a generic packet block applicable to a multiple routing scheme in a low-power sensor network according to an embodiment of the present invention. Referring to FIGS. 7 and 8, the procedures of receiving and generating the generic packet block applicable to the multiple routing scheme in the low-power sensor network is described.

In operation S710, when a sensor node receives a packet, routing semantics are parsed, and thus it may be ascertained whether the packet is a routing packet. In operation S720, a generic routing header is parsed through a routing packet parsing module, and thus basic information such as a routing message type, target address, source address, and the like is parsed.

In operation S730, a destination of a routing message is determined. When the destination of the routing message corresponds to the sensor node, it is determined whether the routing packet is a routing request message in operation S740. When the routing packet is the routing request message as a result of the determining in operation S740, a routing response message is generated in operation S750, and transmitted in operation S760. When the destination of the routing message does not correspond to the sensor node, the routing packet may be forwarded to the destination using information about the generic routing header in operation S745. It is determined whether the routing packet is the routing response message in operation S770. When the routing packet is the routing response message, data is transmitted in operation S780. As illustrated in FIG. 8, routing semantics are generated in operation S810. In operation S820, a generic routing header is generated. In operation S830, a routing block which may be applied depending on a routing scheme is generated.

Thus, routing may be performed using packet information of a routing header of the generic packet block.

According to the present invention, a generic packet block is applicable to multiple routing schemes in low-power sensor networks, and reduces memory requests and packet process calculations required to provide a multi-hop routing function while satisfying a feature of a low-power and low-price sensor node. Also, a method of providing the same may be widely applied to a multi-hop routing. Specifically, generic routing packet information of a multi-hop routing in the low-power sensor network is contained in a generic packet block and applied to a routing scheme, and thus information and processes required for the routing scheme may be reduced and message extension may be widely applied to various multi-hop routing schemes.

Also, according to the present invention, a routing scheme using a defined generic packet block enable to forward a routing message only with the generic routing header information without interpreting a message body, and thereby may improve efficiency of routing for low-power sensor nodes and reduce complexity of routing message processing. Also, according to the present invention, in a generic packet block applicable to a multiple routing scheme in a low-power sensor network and method of providing the same, a generic routing header and message body type may be easily applied to routing algorithms different from each other, a single common packet configuration is used for the multiple routing scheme, even when the routing algorithms are different, a routing function process module of a sensor node needs to change only a packet field value of a routing block instead of the entire routing packet and may be applied to various routing algorithms.

Also, according to the present invention, a defined packet configuration is designed to put the routing information which can be differ by each routing scheme in a routing block, and thereby each routing packets can utilize the routing block to fit its purpose. It enable a routing scheme in a conventional art to be easily applied.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A generic packet block applicable to a multiple routing scheme in a low-power sensor network, the generic packet block comprising:
   routing packet semantics including information about start of a routing packet and a type of routing;
   a generic routing header including routing message type and common information for routing so that the header is applicable no matter which routing schemes are chosen; and
   a routing block including information about the type of the routing and message type of the routing;
   wherein the generic packet block includes information about the generic routing header, routing scheme, and information changeable depending on an operation scheme, the information about the generic routing header and routing scheme being necessary for the routing.

2. The generic packet block of claim 1, wherein the generic routing header includes at least one of an address used for the routing, a maximum number of hops for the routing is performed, a current number of hops on the routing, and a target node address of the routing.

3. The generic packet block of claim 1, wherein the information about the routing type and routing message type is changeable depending on the routing scheme in use.

4. The generic packet block of claim 1, wherein the generic packet block includes a routing body defining a routing block of the routing, and provides an extension of a message with respect to the multiple routing scheme in a sensor network where the multiple routing scheme is applied.

5. A method of providing a generic packet block applicable to a multiple routing scheme in a low-power sensor network, the method comprising:
   separating a generic routing header and routing block and configuring a generic packet block, the generic routing header including a type of routing message and common information for routing so that the header is applicable no matter which routing schemes are chosen, the routing block including information about the routing type and routing message type; and
   transmitting a routing packet using packet information of the generic routing header of the generic packet block;
   wherein the generic packet block includes information about the generic routing header, routing scheme, and information changeable depending on an operation scheme, the information about the generic routing header and routing scheme being necessary for the routing.

6. The method of claim 5, wherein the configuring configures the generic packet block comprising routing packet semantics including information about a start of the routing packet and the type of the routing.

7. A method of controlling a sensor node in a low power sensor network, the method comprising:
   interpreting routing packet semantics including a start of a routing packet, a type of a routing;
   interpreting a generic routing header including at least one of routing message type common information for routing so that the header is applicable no matter which routing schemes are chosen, an address used for the routing, a maximum number of hops where the routing is transmitted, a number of hops where the routing is performed, and a target node address of the routing;
   determining a destination of the routing packet based on information from the interpreted generic routing header;
   determining, when the destination of the routing packet corresponds to a sensor node as a result of the determining of the destination, whether the routing packet is a routing request message; and
   transmitting a routing response message, when the routing packet is the routing request message as a result of the determining of whether the routing packet is the routing request message;
   wherein a generic packet block includes information about the generic routing header, routing scheme, and information changeable depending on an operation scheme, the information about the generic routing header and routing scheme being necessary for the routing.

8. The method of claim 7, further comprising: forwarding the routing packet to another sensor node using information included in the generic routing header, when the destination of the routing packet does not correspond to the sensor node.

* * * * *